Nov. 18, 1958   J. THOMAS ET AL   2,860,726
VEHICLE DRIVE AXLE PINION BEARINGS AND
MEANS FOR LUBRICATING THE SAME
Filed Aug. 4, 1955   2 Sheets-Sheet 1

INVENTORS.
John Thomas
John T. Firth, Jr.
Paul O. Pippel
Atty

Nov. 18, 1958
J. THOMAS ET AL
2,860,726
VEHICLE DRIVE AXLE PINION BEARINGS AND
MEANS FOR LUBRICATING THE SAME
Filed Aug. 4, 1955
2 Sheets-Sheet 2
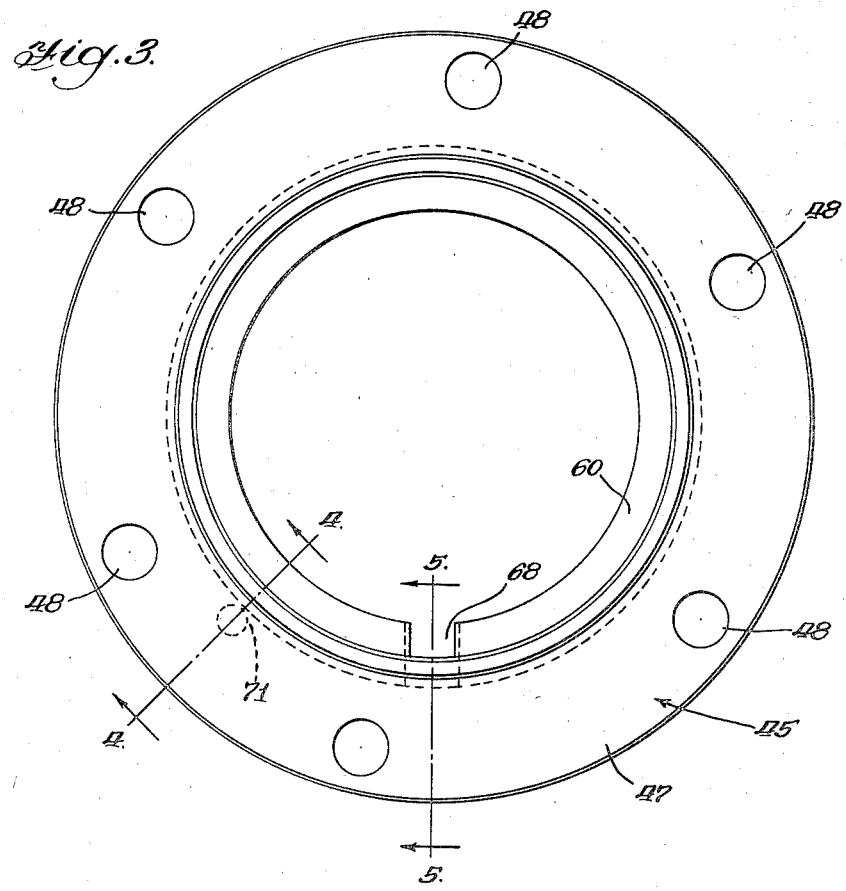
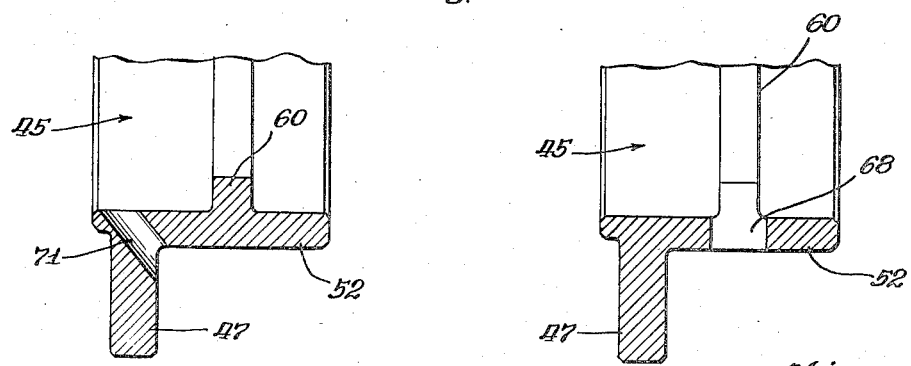
INVENTORS.
John Thomas
John I. Firth Jr.
Paul O. Pippel
Atty.

United States Patent Office 2,860,726
Patented Nov. 18, 1958

2,860,726

VEHICLE DRIVE AXLE PINION BEARINGS AND MEANS FOR LUBRICATING THE SAME

John Thomas and John I. Firth, Jr., Harlan, Ind., assignors to International Harvester Company, a corporation of New Jersey Application August 4, 1955, Serial No. 526,347

9 Claims. (Cl. 184—11)

This invention relates to motor vehicle final driving mechanisms of the differential axle type and more particularly to a unique means for lubricating the differential pinion bearings of such mechanisms.

The final drive axle assembly to which this invention pertains comprises an axle housing structure defining a lubricant reservoir in the bottom thereof. The axle housing is provided with bearings for rotatably supporting the differential driving mechanism which includes a casing, a differential case as is well understood by those skilled in the art, beveled pinions and side gears that constitute the differential proper. A driving gear or ring gear is fixed to the differential case and is driven by a driving pinion which is rotatably carried by anti-friction bearings in the axle housing. In ordinary differential constructions the ring gear and casing operate partially in lubricant contained in the lubricant reservoir in the housing structure. Because of the construction an arrangement of the various components of a vehicle drive axle the pinion bearing is disposed at a higher level than the lubricant in the axle housing reservoir. Thus axle designers have been confronted with the problem of providing a lubricating system for conducting lubricant from the oil reservoir to a bearing which is located substantially above the oil reservoir and as a result many proposals have been advanced to solve the problem. The proposed solutions fall in one of two general categories, namely, those which require the incorporation of a positive action pump for delivering lubricant to the pinion bearing and those which rely upon centrifugal force to throw lubricant from the ring gear and/or differential casing as it rotates in the oil contained in the axle housing reservoir to suitable conduit means providing fluid communication to the bearing. While the former type of lubricating system is suitable for certain types of installations, it is generally not employed because it entails a comparatively complex axle construction and is not economical to manufacture. In the latter type of lubrication system although desirable from the standpoint of simplicity of construction and economy of manufacture has several serious drawbacks as an example at slow speeds such as encountered in certain vehicle operations there is not sufficient centrifugal force produced to supply adequate lubrication with the result that the bearing fails. Furthermore as a lubricant level in the reservoir becomes lowered because of continued use over a prolonged period, the amount of lubricant conveyed by centrifugal force to the pinion bearing would be inadequate to properly lubricate the pinion bearing and thus lubrication of a vital part of the differential could not be depended upon.

The problem of providing lubrication to the pinion bearing is further complicated in automotive vehicles such as motor trucks designed for very heavy duty since it is customary to mount the rear axle main driving pinion in double tapered roller bearings which are adapted to withstand the relatively high radial as well as axial stresses encountered thereby. It is a well known characteristic of tapered roller bearings that they possess an inherent pumping action such that any oil introduced at the large tapered end of the bearing races is immediately expelled by the rollers, consequently the small end of the tapered bearings frequently fails to receive sufficient lubrication which results in overheating of the bearing and substantial shortening of the life thereof. It is therefore one of the important objects of the present invention to provide means for supplying lubricant to a double tapered roller pinion shaft bearing of a vehicle differential located above the normal level of lubricant in the lubricant reservoir of the axle housing under all conditions of operation which means utilizes the effects of centrifugal force and is simple and sturdy in construction and inexpensive to incorporate in a differential drive axle mechanism.

Another object is the provision of a lubrication system for the pinion shaft bearing of an automotive vehicle axle assembly of the type wherein the bearing includes a pair of axially spaced bearing sections having an inherent pumping action and oil is introduced to the bearing at a point between the sections and returned to a main oil sump by the pumping action of one of the bearing sections.

A further object is to provide a splash-lubrication system for a double tapered roller shaft bearing wherein a reservoir is provided for collecting lubricant splashed from a sump disposed at a level lower than the bearing and for storing the lubricant at a higher level than the body of oil in the sump and to provide novel means for effectively supplying the bearing with oil from the reservoir in order that the bearing is adequately lubricated under all conditions of operation.

A still further object is to provide a lubrication system for a shaft bearing having an inherent pumping action wherein the pumping action of the bearing is utilized to circulate oil through the bearing to adequately lubricate the same and to return oil received thereby to the main oil sump.

Another object of the invention is to provide a lubricant reservoir for the pinion shaft bearing which is formed in a unique manner, the walls of which are defined by a portion of the axle housing and the bearing retainer when the latter is assembled in the housing.

Still another object is the provision of means for directing a continuous flow of lubricant to a reservoir encircling a double tapered roller bearing and to provide means for each bearing section with lubricant from the reservoir and means for returning the oil from the bearing sections to the housing oil sump through one of the bearing sections.

Still another object is to provide a novel means for cycling lubricating oil from an axle housing oil sump to a double tapered roller bearing and returning the oil to the axle housing oil sump.

The foregoing objects and desirable features together with many of the purposes and uses thereof will become readily apparent from a reading of the ensuing description in communication with the annexed drawings in which:

Figure 3 is an end view of the bearing retainer;

Figure 4 is a sectional view taken substantially along line 4—4 of Figure 3; and Figure 5 is a sectional view taken substantially along line 5—5 of Figure 3.

Figure 1:
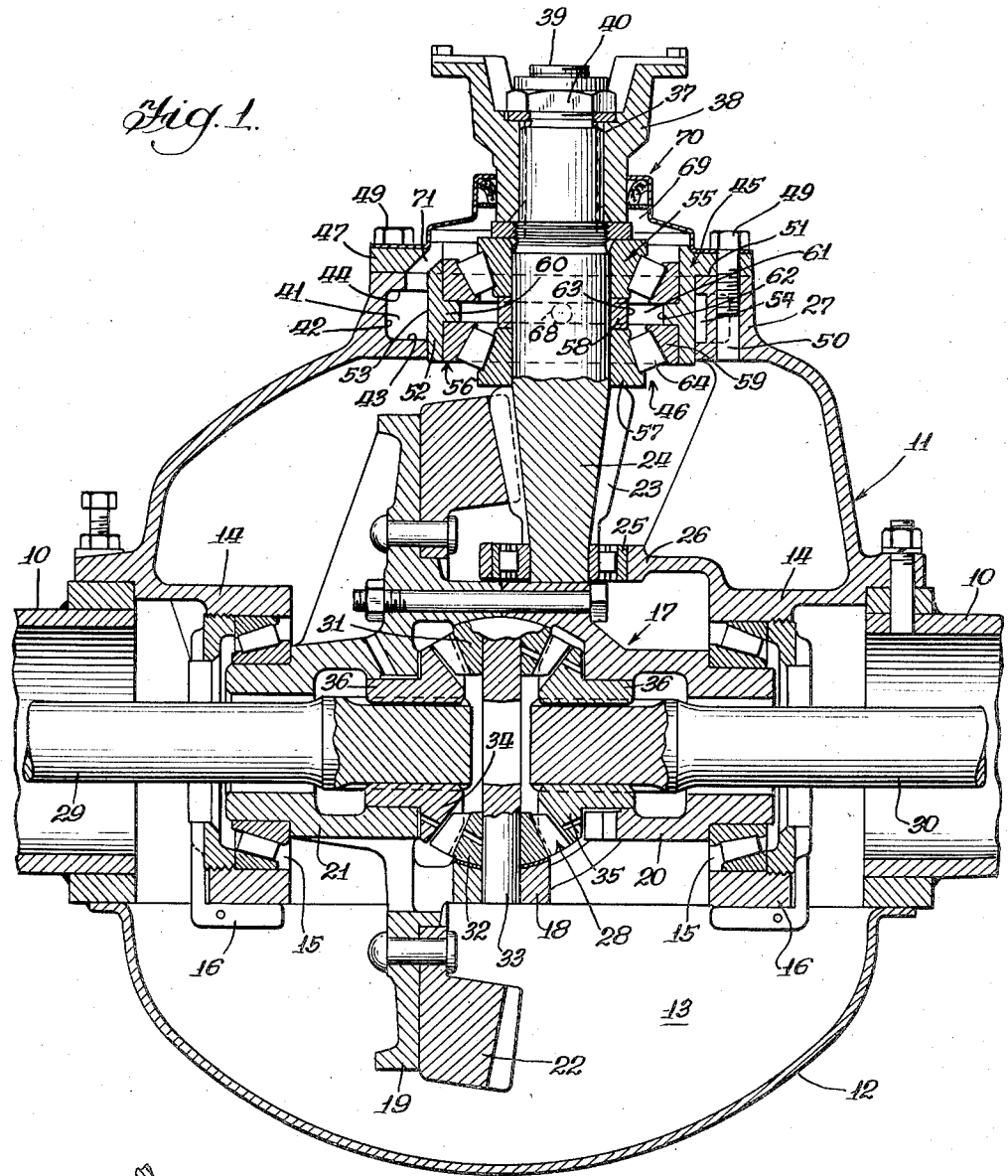
Figure 1 is a plan, sectional view, showing in detail a vehicle drive axle assembly embodying the invention.
Figure 2:
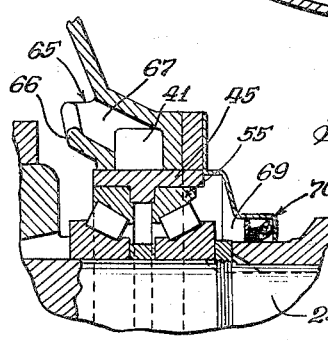
Figure 2 is a fragmentary, detail view, in section, of the relationship between the lubricant reservoir and the lubricant collecting means.

Referring to the drawings in detail, wherein like reference characters designate like elements throughout the various views, there is shown a more or less conventional axle assembly which includes a pair of oppositely extending axle housing portions 10, intermediate the inner ends of which is secured a differential housing structure 11. As shown in Figure 1, a hemispherical cover 12 is secured to the axle housings 10 and with the portion 11 forms a conventional central or "banjo" housing. It will be understood that the "banjo" housing, including the housing 11 and the cover 12, substantially encloses a central portion of the assembly, and forms a lubricant sump 13 in the bottom thereof. The structure 11 is provided with laterally spaced supporting portions 14 adjacent the inner ends of each axle housing 10, respectively. Anti-friction bearings 15 are carried by these supporting portions 14 and are secured therein by bearing caps 16.

A differential casing 17, preferably formed in two parts 18, 19, is rotatably carried by the spaced bearings 15 by sleeve portions 20 and 21 formed on the casing portions 18 and 19, respectively. The casing portion 19 is provided with an annular flange to which is secured for rotation therewith, a ring gear 22. The ring gear 22 and casing 17 are driven by a beveled pinion 23 which is keyed to a pinion shaft 24 adjacent the innermost end thereof. The innermost end of the pinion shaft 24 is rotatably carried by an anti-friction bearing 25 supported in a bearing supporting portion 26 formed integral with the housing portion 11.

A tubular section 27, integrally formed with the differential housing structure 11, is arranged to project forwardly and provides a mount for the pinion shaft 24. The section 27 is of substantially tubular shape and the major axis thereof is coincident with the rotational axis of the pinion shaft 24 which is vertically spaced above the bottom portion of the hemispherical cover 12.

The gear assembly 28 housed within the differential casing 17 may be of any form of construction which is suitable for the transmission of power from the pinion 23 to the axial shafts 29, 30 which extend coaxially of the axle housing portions 10, respectively. As is usual in power transmitting devices of the type shown, the differential casing 17 supports a train of differential gearing comprising a pair or more of beveled gears 31, 32 which are rotatably supported upon a pin 33 and which mesh with a second pair of beveled gears 34, 35. The beveled gears of the latter pair are each formed with a sleeve portion 36 which are journaled in the differential casing 17 and which has a driving connection with the inner end of one of the axle shafts 29, 30. The driving connection may be a spline connection, as shown in Figure 1. The beveled pinion 23 meshes with the ring gear 22, as stated hereinbefore, and the outer end of the pinion shaft 24 is provided with a spline section 37 adapted to receive a coupling member 38. Beyond the spline section 37 is a threaded extension 39 provided with a lock nut 40 by means of which the coupling member 38 is secured to the shaft 24. The vehicle propeller shaft (not shown) is adapted to be connected to the coupling member 38 to rotate the pinion gear 23.

As shown in Figure 1, the tubular section 27 is provided with an internal annular groove or channel 41 which is defined by an axially extending annular wall surface 42 and radially extending axially spaced wall surfaces 43, 44. A bearing retainer 45 in which is mounted a double section taper roller bearing, designated generally by numeral 46, includes a radially outwardly extending end flange 47 provided with a plurality of circumferentially spaced apertures 48 therethrough. A plurality of bolts 49 are utilized to connect the bearing retainer 45 to the tubular section 27 by extending through the apertures 48 into registrable threaded recesses 50 provided in bosses integrally formed with the tubular section 27. It will be noted that the end flange 47 abuts the end face 51 of the tubular section 27 and the bearing retainer 45 further includes an axially extending sleeve-like portion 52 which bridges the axially spaced wall portions 43, 44. The annular outer wall surface 53, between the radially extending wall portions 43, 44, closes the groove or channel 41. The annular space defined by the outer wall surface 53 and wall portions 42, 43 and 44 define a lubricant reservoir 54.

The double bearing section, anti-friction bearing 46 includes a forward bearing section 55 and a rearward bearing section 56 axially spaced from the forward bearing section. Each of the bearing sections 55, 56 includes an inner race 57 having their facing ends abutting an annular spacing ring 58 and are fixed to the pinion shaft 24 for rotation therewith. Each bearing section 55, 56 further includes an outer race 59 non-rotatably secured to the bearing retainer 45 and having their facing ends tightly abutting respective opposite sides of a flange 60 extending radially inwardly and being integrally formed with the sleeve-like portion 52 of the bearing retainer 45. Thus a chamber 61 is provided spaced radially inwardly from the lubricant reservoir 54 and is defined by the annular surface 62 of the peripheral edge of the flange 60, the bearing sections 55, 56 and the outer peripheral surface 63 of the spacing ring 58.

As shown in Figure 1, each bearing section 55, 56 is of a type known as a tapered roller bearing and comprises a series of circumferentially spaced tapered rollers 64 arranged between respective inner and outer annular races 57 and 59. By virtue of the foregoing construction it will be appreciated that the bearing retainer 45 functions to absorb both the radial load and the end thrust transmitted through the bearing sections 55, 56 of the pinion shaft 24. It will be noted that the small diameter end faces of the tapered roller 64 of each bearing section 55, 56 face each other. By virtue of the conical character of the tapered roller 64 each bearing section 55, 56 has an inherent pumping action which is characteristic of that type of bearing section. The pumping action of tapered roller bearing assemblies is such that lubricant will be pumped from the small diameter end of the tapered rollers 64 and discharged from the bearing section at the large diameter ends of the rollers 64. Hence lubricant contained within the chamber 61 will be partially pumped therefrom by the rearward bearing section 56 and discharged directly into the interior of the differential housing structure 11 and the forward bearing section 55 will similarly draw lubricant from the chamber 61 and discharge the same into the chamber 69.

The lubricating system for the pinion shaft bearing sections 55, 56, which is the principal feature of the invention, includes an upwardly opening pocket 65 defined by an integrally formed lip 66 provided on the interior surface of the differential housing 11 above the axis of the pinion shaft 24. The pocket 65 is in position to intercept a portion of the oil flung or splashed against the upper interior wall surface portions of the differential housing 11 by the ring gear 22 as the oil drains down to the sump 13. A longitudinal oil feed or supply passageway or duct 67 formed in the upper portion of the tubular section 27 extends between the pocket 65 and the uppermost point of the lubricant reservoir 54. Thus oil received by the pocket 65 drains by gravity flow to the lubricant reservoir 54 through the longitudinal inclined passageway 67.

Oil stored in the lubricant reservoir 54 flows to the bearing sections 55, 56 through a radially extending duct 68 communicating with the interior of the lowermost portion of the lubricant reservoir 54 and opening into the bottom of chamber 61. The duct 68 is disposed vertically below the axis of the pinion shaft 24 and thus any oil contained within the reservoir 54, even if only partially filled, is free to flow into the chamber 61.

A second chamber 69 spaced axially forwardly of the chamber 61 is provided and is defined by the bearing section 55, the forward end of the bearing retainer 45, and appropriate oil and dust sealing means designated generally by numeral 70. The sealing means 70 is adapted to prevent the entrance of undesirable foreign matter into the chamber 69 and an escape of oil therefrom. As shown in Figures 1, 3 and 4 a return duct 71, formed in the bearing retainer flange 47 and the sleeve-like portion 52, extends between the lower half of the chamber 69 and the lubricant reservoir 54.

In the normal operation of the vehicle drive axle, the level of the lubricant within the sump 13 is sufficiently high to cover the lower portion of the ring gear 22 but is generally below the level of the bearing retainer 45. Upon rotation of the ring gear 22, when the vehicle is propelled, lubricant will adhere to the ring gear and will be flung radially by centrifugal force upon the upper interior surface portions of the differential housing structure 11. As oil deposited upon the wall of the housing drains downwardly by gravity to the sump 13 a portion thereof is collected by the pocket or trough 65. The oil received in the pocket 65 flows, by gravity, through the inclined passageway 67 to the lubricant reservoir 54 and tends to fill the same. By virtue of the fact that the duct 68 establishes free lubricant communication between the chamber 61 and the bottom of the lubricant reservoir 54 oil will be supplied to the chamber 61 even though only a small quantity of oil is present in the lubricant reservoir. Because of the arrangement of the tapered roller 64 of the bearing sections 55, 56 and the inherent pumping action possessed by such bearing sections, as pointed out above, both bearing sections tend to suck oil from the chamber 61 and discharge the oil drawn therethrough in respective axially opposite directions. Thus a portion of the oil is drawn through the rearward bearing section 56 and is pumped into the interior of the differential housing 11 where it ultimately returns to the lubricant sump 13. The pumping action of the forward bearing section 55, on the other hand, causes oil to flow from the chamber 61 through the bearing section 55, to lubricate the same, and is discharged into the chamber 69. The oil discharged into the chamber 69 then returns to the lubricant reservoir 54 through the duct 71 where it mixes with the oil received by the lubricant reservoir from the pocket 65 rather than directly to the lubricant sump 13. It will be appreciated that all of the oil received by the pocket 65 eventually is returned to the lubricant sump 13 solely through the rearward bearing section 56. It will also be appreciated that the duct 71 serves as a means for returning oil from the chamber 69 to the chamber 61 and also prevents lubricant pressure from building up in chamber 69 which could possibly result in damage to the sealing means 70 and allow lubricant to escape between the shaft 24 and the sealing means. From the foregoing it will be appreciated that after a few revolutions of the ring gear 22, after commencing rotation of the pinion shaft 24, the lubricant reservoir 54 will be sufficiently filled with oil to insure an adequate supply of lubricant for lubricating the bearing sections 55, 56 and the oil supply within the reservoir 54 will be continuously replenished by oil collected by the pocket 65 as well as the oil returned to the lubricant reservoir from the chamber 69.

From the foregoing description, it will be seen that as long as the chamber 61 is partially filled with oil the anti-friction bearings 55, 56 will be adequately lubricated and the amount of oil present in the chamber 61 depends upon the quantity of oil within the lubricant reservoir 54. As pointed out above, the reservoir 54 contains a sufficient quantity of oil after a few revolutions of the ring gear 22 to insure positive lubrication of the bearing sections 55, 56. Because of the disposition of the inlet duct 67 and the outlet duct 68 of the reservoir 54, and the fact that the lubricant reservoir is substantially sealed from the differential housing structure 11, once the axle mechanism is initially operated the reservoir 54 will maintain in storage a sufficient amount of oil to lubricate the bearing sections 55, 56 even during those first few revolutions of the pinion shaft 24 occurring each subsequent cycle of operation of the axle mechanism. It will also be appreciated that the bearing sections 55, 56 will be properly lubricated even though they are located above the normal level of the lubricant in the sump 13 and regardless of the speed of rotation of the pinion shaft 24.

The embodiment of the invention chosen for the purposes of illustration and description herein is that preferred for achieving the objects of the invention and developing the utility thereof in the most desirable manner, due regard being had to existing factors of economy, simplicity of design and construction, production methods and improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

We claim:

1. In a vehicle drive axle assembly the combination of a housing having a tubular section projecting from one wall thereof and a sump in the bottom thereof adapted to contain lubricant having a normal level below said tubular section, said tubular section including radially inwardly extending flanges at each end thereof to form a continuous annular channel; a power transmitting mechanism rotatably supported in said housing including a ring gear having a continuous annular surface, the lower portion of said surface being submerged in said lubricant whereby rotation of said ring gear causes lubricant to be thrown from said surface by centrifugal force radially upon the interior surface of said housing; a sleeve-like bearing retainer having a flange extending radially outwardly from one end thereof adapted to abut one of said tubular section flanges and be secured thereto, said bearing retainer bridging said flanges of said tubular section whereby said tubular section continuous annular channel is closed, said bearing retainer including an annular flange intermediate its ends extending radially inwardly; a pinion shaft extending through said bearing retainer carrying a pinion gear meshing with said ring gear to drive the same; a bearing interposed between said bearing retainer and said shaft for rotatably supporting said shaft including a pair of bearing sections, each of said bearing sections being of the tapered-roller type having inner and outer races and having the small ends of its tapered rollers facing the small ends of the tapered rollers of the other bearing section, the outer race of each of said bearing sections abutting a respective opposite axial face of said radially inwardly extending flange of said bearing retainer to be spaced from the other bearing section thereby; duct means extending radially through said bearing retainer for establishing lubricant communication between said channel and the space between said bearing sections, said duct means being formed in the lowermost portion of said radially inwardly extending flange of said bearing retainer; sealing means secured to said radially outwardly extending flange of said bearing retainer and engaging said shaft, said sealing means being axially spaced from one of said bearing sections and partially defining a lubricant-receiving chamber for receiving lubricant from one of said bearing sections; duct means extending from said chamber to said channel at a point above the lowermost portion thereof; and means for collecting lubricant deposited on the interior wall surface of said housing above said tubular section and conducting all of the collected lubricant to the uppermost portion of said channel by gravity.

2. In a driving axle, the combination of a housing having a body of lubricant in the bottom thereof and a tubular section projecting therefrom above the normal level of the lubricant; a power transmitting mechanism rotatably supported in said housing including a gear wheel having a continuous annular surface, the lower portion of said surface being submerged in said lubricant whereby rotation of said gear wheel causes lubricant to be thrown from said surface by centrifugal force radially upon the interior surface of said housing; a bearing retainer mounted in said tubular section; a shaft extending through said bearing retainer carrying a pinion gear meshing with said gear wheel to drive the same; a bearing interposed between said bearing retainer and said shaft for rotatably supporting said shaft including a pair of axially spaced front and rear bearing sections, each of said bearing sections being of the tapered-roller type having inner and outer races and having the small ends of its tapered rollers facing the small ends of the tapered rollers of the other bearing section, portions of said bearing sections defining walls of a first annular lubricant-receiving chamber, said chamber being in lubricant communication with each of said bearing sections; a second lubricant-receiving chamber for receiving lubricant flowing through one of said bearing sections; lubricant communication means extending between said first chamber at a point above the lowermost portion thereof and said second chamber; a continuous annular lubricant reservoir coaxial with and radially outwardly spaced from said bearing section outer races, said reservoir being defined by wall portions of said bearing retainer and said tubular section; means for establishing lubricant communication between the lowermost portion of said reservoir and the lowermost portion of said first chamber; a trough-like pocket on the interior surface of said housing spaced above the normal level of the lubricant in the bottom of said housing for receiving lubricant thrown by said gear wheel; and duct means for conducting lubricant from said pocket to the uppermost portion of said reservoir by gravity.

3. In a driving axle substantially as set forth in claim 2, in which, said means for establishing lubricant communication between said reservoir and said first chamber includes a radially extending passageway formed in said bearing retainer opening into the bottom of said reservoir and the bottom of said first chamber; and the lubricant communication means extending between said first and second chambers is vertically spaced above said passageway.

4. In a vehicle drive axle assembly the combination of a housing embodying a sump in the bottom thereof for containing lubricant and a tubular section projecting from one wall thereof above the level of the lubricant contained in said sump; a power mechanism rotatably supported in said housing including a ring gear adapted to dip into the lubricant in said sump and fling lubricant by centrifugal force on the interior wall surface of said housing; a pinion shaft extending through said tubular section having a pinion gear on one end thereof meshing with said ring gear to drive the same; a sleeve-like bearing retainer disposed within and extending substantially the full length of said tubular section, said bearing retainer having a flange extending radially outwardly from one end thereof adapted to be secured to said tubular section and a radially inwardly extending annular flange spaced intermediate the ends thereof; bearing means for rotatably supporting said shaft including a pair of anti-friction roller bearing sections having inner and outer races, the outer races of said bearing sections adapted to abut respective opposite axial faces of said radially inwardly extending flange; a continuous annular lubricant reservoir formed in said tubular section and partially defined by the outer peripheral surface of said bearing retainer; a single radially extending duct leading from the lowermost portion of said oil reservoir to the space between said bearing sections; a lubricant-receiving chamber spaced axially outwardly from the space between said bearing sections adapted to receive lubricant from said space through one of said bearing sections, said chamber being partially defined by sealing means secured to said radially outwardly extending flange of said bearing retainer and engaging said shaft; a lubricant duct extending through said bearing retainer and said tubular section for returning oil from said chamber to said reservoir above the lowermost portion thereof; and means for collecting and conducting lubricant splashed on the interior surface of said housing to the uppermost portion of said reservoir including an open-topped pocket extending axially from the interior wall surface of said housing and spaced vertically above the normal level of the lubricant in said sump, and a channel extending through the wall of said housing and opening into said pocket and said reservoir, said pocket being disposed at a higher level than the uppermost part of said reservoir whereby said lubricant collected by said pocket flows by gravity to said oil reservoir.

5. In a vehicle drive axle assembly the combination of a housing having a sump in the bottom thereof for containing lubricant and opening in the wall thereof above the normal level of the lubricant in the sump; a drive shaft extending through said opening; bearing means carried by said housing for rotatably supporting said shaft including a pair of axially spaced, anti-friction bearing sections; an annular lubricant reservoir coaxial with and radially spaced outwardly of said bearing sections; first and second lubricant-receiving chambers, said chambers being axially spaced with respect to each other and radially spaced inwardly of said reservoir, one of said bearing sections serving as a common wall portion between said first chamber and the interior of said housing and the other bearing section serving as a common wall portion for said first and second chambers; lubricant duct means extending between the bottom of said first chamber and the lowermost portion of said reservoir; lubricant duct means extending between said reservoir and second chamber, said duct means being spaced vertically above said first-mentioned duct means; and means for supplying said reservoir with lubricant from said sump.

6. In a vehicle drive axle assembly substantially as set forth in claim 5, in which, said last-mentioned means includes a trough-like pocket on the interior surface of said housing spaced above said opening, a rotatable member driven by said drive shaft having a peripheral surface, the lower portion of said surface being submerged in the lubricant in said sump whereby rotation of said rotatable member causes lubricant to be thrown from said surface by centrifugal force radially upon the interior surface of said housing and into said pocket, and duct means for conducting lubricant from said pocket to the uppermost portion of said reservoir by gravity.

7. In a vehicle drive axle assembly including a housing having a lubricant sump in a lower portion thereof, said housing having a tubular section projecting therefrom above the normal level of the lubricant in said sump; a shaft extending through said tubular section; a bearing retainer secured to said tubular section; axially spaced anti-friction bearing sections interposed between said bearing retainer and said shaft; gearing in said housing including a gear with its lower portion disposed in said lubricant and a pinion gear on said shaft meshing with said gear; a lubricant reservoir coaxial with and radially spaced from said anti-friction bearing sections and partially defined by the outer peripheral surface of said bearing retainer; means communicating between the uppermost portion of said reservoir and the interior of said housing adapted to receive lubricant flung from said gearing when rotating; an annular passageway axially spaced between said bearing sections; means for establishing lubricant communication between the bottom of said passageway and the bottom of said reservoir; a second sump chamber adjacent one of said bearing sections communicating with said one of said bearing sections and said passageway.

8. In a vehicle drive axle assembly the combination of a housing having a sump in the bottom thereof for containing lubricant; a drive shaft extending through said housing; bearing means interposed between said shaft and housing for rotatably supporting said shaft including a pair of axially spaced, anti-friction bearing sections; an annular lubricant reservoir coaxial with and radially spaced outwardly of said bearing sections; a first chamber between said bearing sections and radially inwardly of said reservoir, said chamber being in lubricant communication with said bearing sections; lubricant duct means extending between the bottom of said first chamber and the bottom of said reservoir; a second chamber in lubricant communication with one of said bearing sections; lubricant duct means extending between said reservoir and second chamber; and means for supplying the uppermost portion of said reservoir with lubricant from said sump.

9. In a vehicle drive axle assembly substantially as set forth in claim 8, in which, one of said bearing sections is adapted to pump lubricant axially from said first chamber to said second chamber, and the other of said bearing sections is adapted to pump lubricant axially from said first chamber to the interior of said housing and constituting the sole means for returning lubricant to said sump from said reservoir.

References Cited in the file of this patent
UNITED STATES PATENTS

| | | |
|---|---|---|
| 2,147,146 | Carlson | Feb. 14, 1939 |
| 2,178,900 | Starr | Nov. 7, 1939 |
| 2,240,118 | Matthews | Apr. 29, 1941 |
| 2,368,963 | Boden | Feb. 6, 1945 |
| 2,430,397 | Hendricks | Nov. 4, 1947 |